US012665463B2

(12) United States Patent
Kreil

(10) Patent No.: US 12,665,463 B2
(45) Date of Patent: Jun. 23, 2026

(54) MACHINE HOUSING, METHOD FOR PRODUCING A MACHINE HOUSING, AND MACHINE COMPRISING SUCH A MACHINE HOUSING

(71) Applicant: Bayerische Motoren Werke Aktiengesellschaft, Munich (DE)

(72) Inventor: Franz Kreil, Pliening (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 201 days.

(21) Appl. No.: 18/684,581

(22) PCT Filed: Sep. 22, 2022

(86) PCT No.: PCT/EP2022/076384
§ 371 (c)(1),
(2) Date: Feb. 16, 2024

(87) PCT Pub. No.: WO2023/061720
PCT Pub. Date: Apr. 20, 2023

(65) Prior Publication Data
US 2025/0125679 A1 Apr. 17, 2025

(30) Foreign Application Priority Data
Oct. 14, 2021 (DE) ..................... 10 2021 126 592.4

(51) Int. Cl.
*H02K 5/16* (2006.01)
*H02K 7/00* (2006.01)
*H02K 15/144* (2025.01)
(52) U.S. Cl.
CPC ............... *H02K 5/16* (2013.01); *H02K 7/003* (2013.01); *H02K 15/144* (2025.01)

(58) Field of Classification Search
CPC ........ H02K 15/144; H02K 7/003; H02K 5/16; H02K 5/15
See application file for complete search history.

(56) References Cited

U.S. PATENT DOCUMENTS 5,616,973 A * 4/1997 Khazanov ........... F04D 29/5806
310/58
6,082,221 A 7/2000 Boeing et al.
(Continued)

FOREIGN PATENT DOCUMENTS

DE        36 39 123 C1   1/1988
DE        42 06 246 C1   6/1993
(Continued)

OTHER PUBLICATIONS

SU-1644305-A1 machine translation Oct. 30, 2025.*
(Continued)

*Primary Examiner* — Leda T Pham
(74) *Attorney, Agent, or Firm* — Crowell & Moring LLP

(57) ABSTRACT
A machine housing including a first housing part, a second housing part, and two straight centering elements. Each centering element engages both in one of the first centering element receptacles and in one of the second centering element receptacles, such that the centering element receptacles connected via the centering element are aligned axially with one another, such that the housing parts are aligned with one another such that the shaft bearing seats are centered axially along a common shaft bearing axis. A respective longitudinal center axis of the centering elements extends obliquely or perpendicularly to the shaft bearing axis.

12 Claims, 1 Drawing Sheet

(56)          References Cited

U.S. PATENT DOCUMENTS

| | | | |
|---|---|---|---|
| 2007/0210655 | A1 * | 9/2007 | Bahr ...................... H02K 5/203 |
| | | | 310/89 |
| 2020/0347925 | A1 | 11/2020 | Lanz |

FOREIGN PATENT DOCUMENTS

| | | | | | |
|---|---|---|---|---|---|
| DE | 197 15 016 | A1 | 10/1998 | | |
| DE | 20319356 | U1 * | 6/2005 | .............. | H02K 5/15 |
| DE | 102009045844 | A1 * | 4/2011 | .............. | H02K 9/19 |
| DE | 10 2019 206 236 | A1 | 11/2020 | | |
| SU | 1644305 | A1 * | 4/1991 | | |

OTHER PUBLICATIONS

DE-20319356-U1 machine translation Oct. 30, 2025.*
DE-102009045844-A1 machine translation Oct. 30, 2025.*
International Search Report (PCT/ISA/210) issued in PCT Application No. PCT/EP2022/076384 dated Jan. 3, 2023 with English translation (5 pages).
German-language Written Opinion (PCT/ISA/237) issued in PCT Application No. PCT/EP2022/076384 dated Jan. 3, 2023 with English translation (8 pages).
German-language Search Report issued in German Application No. 10 2021 126 592.4 dated Jul. 11, 2022 with partial English translation (10 pages).

* cited by examiner

MACHINE HOUSING, METHOD FOR PRODUCING A MACHINE HOUSING, AND MACHINE COMPRISING SUCH A MACHINE HOUSING

BACKGROUND AND SUMMARY

The present disclosure relates to a machine housing, for example a so-called central housing of an electric machine. Furthermore, the disclosure relates to a method for producing such a machine housing. In addition, the disclosure relates to a machine, for example an electric machine, which has such a machine housing.

In machines, in particular electric machines, it is frequently the case that a shaft of the machine, for example a rotor shaft, is mounted in a multipart housing by means of appropriate shaft bearings. In other words, this machine shaft is mounted on a first housing part by means of a first shaft bearing and on a second housing part by means of a second shaft bearing. Corresponding bearing seats, in which the shaft bearings are located in the housing parts, are created in an assembled state of the housing, that is to say when the at least two housing parts have been fastened together as intended. These bearing seats are usually in the form of bores. In order then to fit the shaft bearings in the shaft bearing seats, the housing has to be taken apart again after the shaft bearing seats have been formed. Once the shaft bearings have then been fitted, the two housing parts have to be aligned with one another particularly exactly in order that shaft bearing axes of the shaft bearings coincide exactly, such that the shaft mounted by means of the shaft bearings is located in an exactly straight manner in both shaft bearings. This means that particularly exact repositioning needs to be ensured when assembling the housing parts, in order to comply with functional requirements (coaxiality, parallelism, position, etc.).

In mechanical engineering, it is known, for example, to initially produce the machine housing in one piece or to connect the housing parts in a materially bonded manner in order subsequently to form the shaft bearing seats in a one-piece housing. Then, the previously one-piece housing is cracked (fracture-separated), as is known from the construction of connecting rods. A further possibility is to impress a defined tooth-like structure on a harder of the two assembled housing parts into the softer counterpart under pressure. However, these two approaches require particular prerequisites with regard to the usable materials and/or with regard to particular production methods.

Furthermore, DE 10 2019 206 236 A1 discloses a housing for a structural unit of a vehicle drive train, which comprises two housing parts, wherein the two housing parts are aligned with one another by means of a pin which engages in the two housing parts. In that case, the pin extends parallel to a main axis of the housing, wherein the housing is in particular a transmission housing. DE 197 15 016 A1 discloses a two-part housing which has two housing parts that have a plurality of coaxially realized bores. Each of these bores is surrounded, in each housing part, concentrically by a centering means which is embodied as an inner centering means in one housing part and as an outer centering means in the other housing part. In that case, the centering means engage with one another with a precise fit, such that the housing parts are aligned with one another. Moreover, DE 42 06 246 C1 discloses a device for the precisely aligned assembly of two housings with a common shaft. An off-center shaft position that exists during assembly as a result of bearing play is compensated by way of an auxiliary assembly hub that exhibits a center offset between its shaft centering means and the outside diameter. At the outside diameter, the other housing is received at a fit bore assigned to a bearing of the shaft. These possible ways of aligning the two housing parts with one another are particularly complicated, however.

One object of the disclosure is to align at least two housing parts repeatably with one another particularly easily and with particularly little complexity and also precisely and without loss of accuracy.

This and other objects are achieved by the subject matter of the disclosure. Features, advantages and advantageous refinements that are set out in the description should be considered at least analogously to be features, advantages and advantageous refinements of the subject matter of the disclosure. Further possible refinements of the disclosure are disclosed in the following description and the figures.

In a first aspect of the disclosure, a machine housing, for example a so-called central housing of an electric machine, is proposed. The machine housing has a first housing part, which comprises a first shaft bearing seat and two first centering element receptacles. In addition, the machine housing has a second housing part formed separately from the first housing part, for example a housing cover, which has a second shaft bearing seat and two second centering element receptacles. Each shaft bearing seat is in the form, for example, of a respective bore, in particular a through-bore, wherein each shaft bearing seat is designed to hold a respective shaft bearing, in particular a rolling bearing, such that, by means of the shaft bearings, a shaft is able to be mounted rotatably on the two housing parts and consequently on/in the machine housing. Since the machine housing is in particular a housing of an electric machine, for example of a traction motor of an at least partially electrically drivable or movable motor vehicle, the shaft is consequently, for example, a rotor shaft of the electric machine. As a result, the machine housing may be for example a rotor chamber of the electric machine.

The machine housing furthermore has two straight centering elements, wherein each centering element engages both in one of the first centering element receptacles and in one of the second centering element receptacles at the same time, such that the centering element receptacles connected by means of the centering element are aligned axially with one another. Each centering element is, for example, formed as a straight circular cylinder and accordingly has a straight longitudinal center axis at which—in the assembled state of the machine housing—the two housing parts are aligned with one another such that both a relative rotation and a relative movement in translation between the two housing parts are prevented on account of the centering element engaging in the first centering element receptacle and in the second centering element receptacle. In this case, a longitudinal center axis of the first centering element receptacle and also a longitudinal center axis of the second centering element receptacle and the longitudinal axis of the corresponding centering element coincide.

As a result, the housing parts are aligned with one another such that the shaft bearing seats are centered axially along a common shaft bearing axis, wherein a respective longitudinal center axis of the centering elements extends obliquely or perpendicularly to the shaft bearing axis. The shaft bearing axis is for example a so-called main axis of the machine housing, about which the shaft held or mounted in the machine housing, for example a rotor shaft, rotates or is rotated when the electric machine is in operation. In this case, the two housing parts are aligned so exactly with one another that a longitudinal center axis of the shaft and the shaft bearing axis given or defined by the shaft bearing seats coincide with one another.

In this way, a particularly exact fit of the shaft of the electric machine in relation to the shaft bearing seats or in relation to the housing parts is advantageously ensured, wherein, in particular, a tilted fit of the shaft in the shaft bearing seats or in the shaft bearings is prevented. This results both in particularly quiet operation of the electric machine that has the machine housing and in a particularly long service life and particularly low bearing losses on account of particularly low friction in the shaft bearings.

In a further or second aspect of the disclosure, a method for producing such a machine housing is proposed. In the method, a first housing blank and a second housing blank are provided, from which the two housing parts are manufactured. To this end, the two housing blanks are fastened together reversibly in a non-destructive manner by means of a fastening device, for example screwed together. The arrangement having the two housing blanks is thus not formed in one piece and so material separation (sawing, breaking, weld cutting etc.) is not necessary when taking apart the arrangement.

In a further step of the method for producing the machine housing, the first centering element receptacles are formed on the first housing blank and the second centering element receptacles are formed on the second housing blank. For example, the centering element receptacles are formed by partially drilling into the housing blanks. Each centering element receptacle is formed in particular as a straight circular hollow cylinder, wherein an inside diameter of the respective centering element receptacle and an outside diameter of the respective centering element correspond to one another. In this case, provision is made in particular for a respective inside diameter of each first centering element receptacle to have an undersize in relation to the respective outside diameter of each centering element, such that the respective centering element is able to be inserted into, and fastened in, the respective first centering element receptacle by way of a press fit.

In a further step of the method—while the two housing blanks are fixed together by means of the fastening device—the first shaft bearing seat is formed on the first housing blank and the second shaft bearing seat is formed on the second housing blank. As a result, the housing parts are produced and the shaft bearing axis is defined. This means that, in this stage of the method, the arrangement has the two housing parts, which are fixed or fastened together reversibly in a non-destructive manner by means of the fastening device.

In a further step of the method, one of the centering elements is then inserted into the respective first centering element receptacle. If the first housing part thus has two centering element receptacles, two centering elements are inserted or driven into the first housing part. It should be understood that the machine housing may generally have more than two centering elements and consequently more than two first centering element receptacles and more than two second centering element receptacles. In any case, the number of centering elements corresponds to a respective number of the first centering element receptacles and second centering element receptacles.

Before, during or after the insertion of the centering elements into the first centering element receptacles, the housing parts are detached from one another, meaning that the arrangement having the two housing parts is taken apart. In the process, there is no material separation, i.e. damaging, of the housing parts. To take apart the arrangement, i.e. to detach the housing parts from one another, the fastening device is opened or released as intended, for example the screw connection is unscrewed. In this stage of the method, the housing parts are then separate from one another, and so corresponding shaft bearings and the machine shaft can be inserted into the associated shaft bearing seats of the housing parts particularly easily and/or with particularly little complexity. In order to detach the housing parts non-destructively from one another, it is furthermore necessary for the centering elements to be detached from the first housing part and/or from the second housing part, and this may take place for example in that the centering elements are removed from the first centering element receptacles. In any case, the centering elements should be put into a position in which they do not simultaneously engage in both housing parts.

In a further aspect of the disclosure, a machine is proposed which has the machine housing. In this case, the machine shaft is rotatably mounted coaxially with the shaft bearing axis via the shaft bearing seats both by means of the first housing part and by means of the second housing part. In particular, the machine is an electric machine, for example a traction motor for an electrically drivable motor vehicle. Accordingly, the machine shaft may be for example a rotor shaft of the machine. When the machine housing is used as intended, for example in an intended installation condition, the machine thus has the machine housing. Consequently, the machine has both the housing parts and the centering elements and also the centering element receptacles.

The machine housing produced by means of the method set out above and consequently the machine having the machine housing are able to be assembled and maintained (repaired) particularly easily and/or with particularly little complexity, since the two housing parts—when they are separated from one another—can be (re-)oriented with one another particularly exactly and precisely such that the shaft bearing seats and consequently the machine shaft mounted by means of the shaft bearing seats coincide particularly precisely with the shaft bearing axis. As a result of the use of the centering elements, which may also be referred to as register pins, the machining methods and the materials used to produce the housing blanks are furthermore freely selectable.

In one development of the machine housing, the longitudinal center axis of at least one of the centering elements and the shaft bearings are arranged in a skew manner with respect to one another. In other words, the longitudinal center axis of the corresponding centering element and the shaft bearing axis do not intersect. Provision may be made for both, in particular all, of the centering elements that the machine housing has to be arranged such that they are each arranged in a skew manner with respect to the shaft bearing axis. Accordingly, the centering element receptacles corresponding to the centering elements are formed in/on the corresponding housing part such that a common longitudinal center axis of a pair made up of a first and a second centering element receptacle that are connected or connectable by means of one of the centering elements are arranged in a skew manner with respect to the longitudinal center axis. Provision is made here, in particular, for at least two of the centering elements in the installed state, i.e. when the respective centering element engages both in one of the first centering element receptacles and in one of the second centering element receptacles, not to be arranged parallel to one another. This effectively prevents the two housing parts from being twisted relative to one another about the shaft bearing axis and the housing parts from being moved in translation to one another transversely to the shaft bearing axis.

In one development of the machine housing, the longitudinal center axis of at least one of the centering elements and an (imaginary) plane that is arranged perpendicularly to the shaft bearing axis coincide. In other words, the longitudinal center axis of the corresponding centering element extends in the plane that is penetrated or intersected perpendicularly by the shaft bearing axis. Thus, the production of the centering element receptacles is particularly simple and, furthermore, a particularly reliable fit of the centering elements in the centering element receptacles is ensured.

According to one development, the machine housing may be formed in a plane-symmetric manner with regard to a mirror plane, wherein this mirror plane and the shaft bearing axis coincide. In other words, the shaft bearing axis extends entirely in the mirror plane. A consequence of such a configuration of the machine housing is, inter alia, that one of the centering elements is arranged on one side of the mirror plane while the other of the centering elements is arranged on the other side of the mirror plane. In this case, the longitudinal center axes of these centering elements meet at a common point which lies in the mirror plane. As a result, the construction or production of the machine housing is even simpler.

It is generally the case for the machine housing, in particular, that—apart from the centering element receptacles and the centering elements—it is formed in a rotationally symmetric manner. This means that the first housing part, by which, for example, a machine chamber of the machine or of the machine housing is formed, may be formed as a circular ring cylinder, wherein the second housing part, by which, in particular, a housing cover corresponding to the machine chamber is formed, may be formed as a circular disk.

In conjunction with the centering elements and centering element receptacles arranged in a mirror-inverted manner, provision is made—according to one development of the machine housing—for the longitudinal center axes of two centering elements arranged on different sides of the mirror plane to enclose an angle other than 0° and than 180° with one another in the mirror plane. In this case, the apex of the angle is the point in the mirror plane at which the longitudinal center axes of the centering elements or of the correspondingly associated centering element receptacles intersect one another. This results in a V-shaped arrangement of the centering elements and of the respective pairs, wherein the respective pair has a first centering element receptacle and an associated second centering element receptacle. As a result, rotational and translational positional fixing between the housing parts is particularly efficient.

In order to make both the assembly and the disassembly of the two housing parts even easier or even less complex, provision is made, according to one development of the machine housing, for the second housing part to have a collar element on which one of the second centering element receptacles is formed. In this case, the collar element surrounds an external circumferential side of the first housing part at least regionally, wherein the collar element may be, for example, in the form of a continuous circular ring. It is also conceivable for the collar element to be interrupted, in particular interrupted several times, along the external circumferential direction of the housing part, meaning that the collar element may have an at least substantially crenellated shape. On/in the respective crenellation portion of the collar element, the corresponding second centering element receptacle is then formed. Provision may be made for the collar element to have as many crenellation portions as the second housing part has second centering element receptacles. Accordingly, one of the second centering element receptacles is then formed on each of the crenellation portions. As a result, the concept of a particularly simple machine housing and production involving particularly little raw material is taken account of to a particular extent.

In conjunction with the crenellated structure of the collar element, in a further configuration of the machine housing, the second centering element receptacle formed on the collar element is in the form of a groove in the collar element. In this case, an internal contour of the groove corresponds to an external contour of the respective centering element. In particular, the groove has a depth which corresponds at most to an outside radius dimension of the respective centering element, such that the centering element is enclosed by the groove at most through 180° along its external circumferential direction. This is because—as already stated—the respective centering element is in particular a circular cylindrical register pin which, in the assembled state of the machine housing, is fastened in a corresponding one of the first centering element receptacles. In order to take apart the machine housing, i.e. to non-destructively separate the housing parts from one another, it is not necessary, on account of the second centering element receptacle in the form of the groove, to drive the centering element or register pin along its longitudinal center axis out of the corresponding first centering element receptacle. Accordingly, it is also not necessary, when assembling the two housing parts, to drive the centering element or register pin through the second centering element receptacle and consequently into the first centering element receptacle. Instead, the centering element can remain fastened in the first centering element receptacle, wherein it projects out of the first housing part, that is to say out of the first centering element receptacle. When the housing parts are assembled, the centering element and second centering element receptacle in the form of a groove are then moved toward one another in the assembly direction. The assembly direction may extend parallel along the designated shaft bearing axis or coincide therewith. The groove and the centering element are, in particular, moved toward one another along a radius of the groove or of the centering element until an external circumferential surface of the centering element and an internal circumferential surface of the groove directly adjoin one another or are directly and extensively in contact with one another.

In one development of the machine housing, at least one of the first centering element receptacles is in the form of a blind hole. Furthermore, it is conceivable for both, in particular all, of the centering element receptacles to be in the form of respective blind holes. This means that, when the respective centering element receptacle which is in the form of a blind hole is formed, a wall element of the first housing part is merely partially drilled, but not drilled all the way through. This is advantageous in particular when the machine housing is used as part of an electric machine which is in the form of a wet running machine. This is because the chamber defined or formed at least partially by the first housing part is able to be sealed off from an environment of the machine housing so particularly easily and/or with such little complexity that it is possible to prevent a fluid, for example a wet runner liquid, from escaping undesirably from the machine housing particularly easily or with particularly little complexity.

In a further configuration of the machine housing, at least one of the first centering element receptacles is in the form of a through-hole which is sealed off on one side by means of a sealing element. Provision may furthermore be made in the machine housing for a plurality of the first centering element receptacles to be in the form of respective through-holes. In particular, all of the first centering element receptacles are in the form of respective through-holes. This means that when the corresponding first centering element receptacle is formed, the wall element of the first housing part is drilled through to such an extent that an interior of the first housing part, for example the machine chamber, and an environment of the first housing part are connected fluidically together by means of the through-hole. Particularly simple production of the through-hole or of the corresponding first centering element receptacle is accepted at the price of installing a sealing element. Provision may be made for the sealing element, by means of which the corresponding through-hole is sealed off such that a fluid, for example the wet runner liquid, cannot flow through it, to be formed by that one of the centering elements that is inserted or pressed into the first centering element receptacle in the form of the through-hole.

Further features of the disclosure may become apparent from the claims, the figures and the description of the figures. The features and combinations of features mentioned previously in the description and the features and combinations of features shown below in the description of the figures and/or only in the figures are usable not only in the combination specified in each case but also in other combinations or on their own, without departing from the scope of the disclosure.

In the drawings:

DETAILED DESCRIPTION OF THE DRAWINGS

Figures 1, 2, 3:
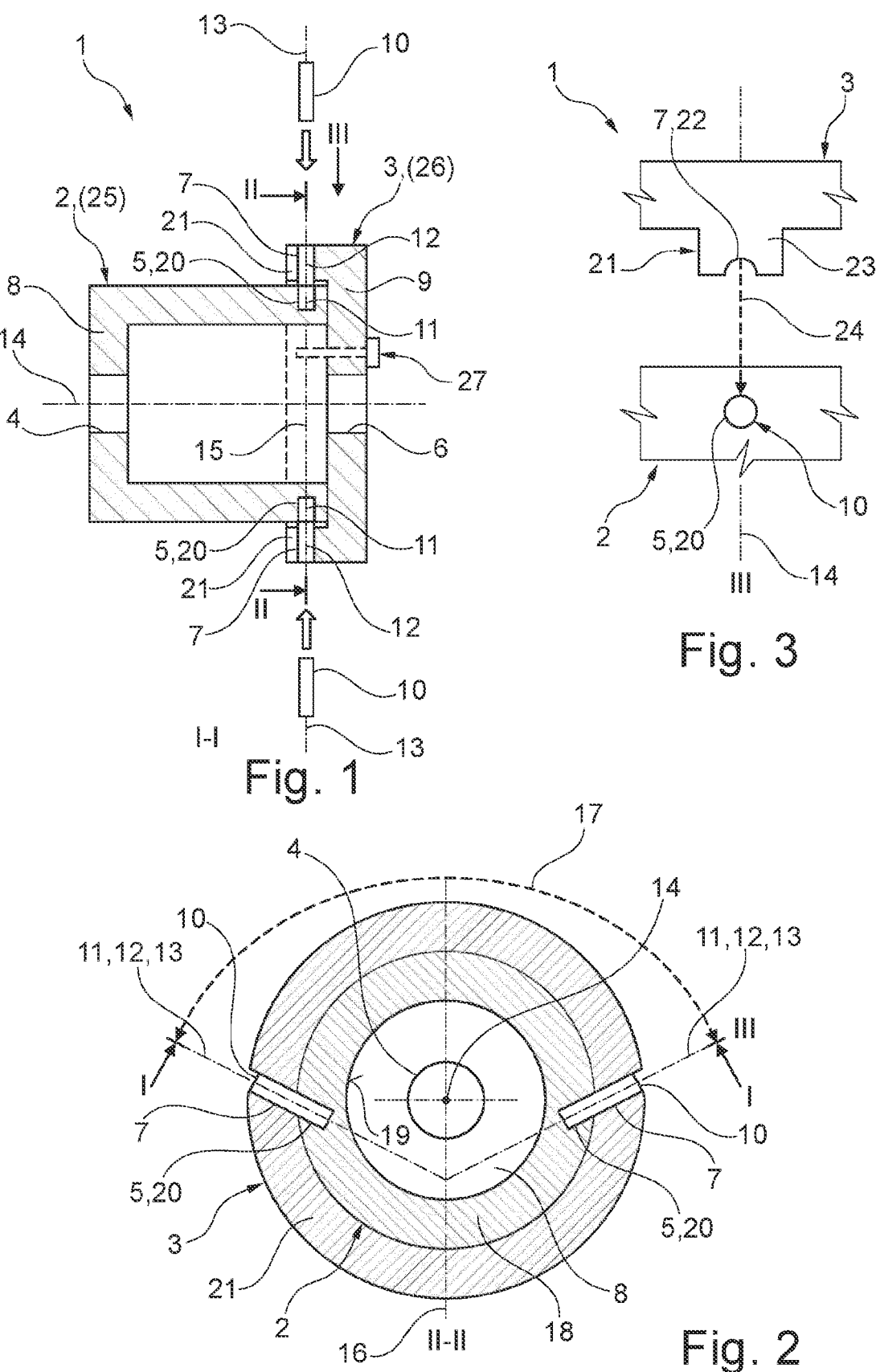
FIG. 1 shows a schematic and sectional view of a machine housing which is assembled from two mutually corresponding housing parts.
FIG. 2 shows a schematic and sectional view of the machine housing, wherein the two housing parts have been aligned with one another by means of two centering elements.
FIG. 3 shows a schematic detail view of a respective part of the two housing parts, wherein one of the housing parts has, as centering element receptacle, a groove corresponding to the centering element.

In the following text, a common description is given in relation to a machine housing 1, to a machine (not illustrated) having the machine housing 1, and to a method for producing the machine housing 1. In the figures, identical and functionally identical elements are provided with the same reference signs.

In this regard, FIG. 1 shows a schematic view, in section along a section plane I-I (see FIG. 2), of the machine housing 1, which is assembled from two mutually corresponding housing parts 2, 3. In this case, a spacing is provided between the housing parts 2, 3 in a radial direction in order to avoid overdetermination. The machine, which is in particular an electric machine ("electric motor"), has the machine housing 1, wherein the first housing part 2 has a first shaft bearing seat 4 and two first centering element receptacles 5. The first housing part 2 and the second housing part 3 are formed separately from one another, meaning that there is no materially bonded connection between the two housing parts 2, 3. The second housing part 3 has a second shaft bearing seat 6 and two second centering element receptacles 7. The respective shaft bearing seat 4, 6 is designed to hold a shaft bearing (not illustrated), in particular a rolling bearing, such that, via the respective shaft bearing, a machine shaft (not illustrated), in particular a rotor shaft, of the machine can be mounted rotatably in/on the machine housing 1. In the present example, the respective shaft bearing seat 4, 6 is in the form of a through-hole, for example a through-bore, which passes entirely through a first base element 8 of the first housing part 2 and second base element 9 of the second housing part 3.

The machine housing 1 also has two straight centering elements 10, wherein, in the assembled state of the machine housing 1—see FIG. 2—the respective centering element 10 engages simultaneously both in one of the first centering element receptacles 5 and in one of the second centering element receptacles 7. As a result, those of the first centering element receptacles 5 and those of the second centering element receptacles 7 that are connected together by means of the centering element 10 are aligned axially with one another. In other words, a longitudinal center axis 11 of the corresponding first centering element receptacle 5, a longitudinal center axis 12 of the corresponding second centering element receptacle 7 and a longitudinal center axis 13 of the corresponding centering element 10 coincide.

As a result, the housing parts 2, 3 are aligned with one another such that the shaft bearing seats 4, 6 are centered axially along a common straight shaft bearing axis 14. In this case, the longitudinal center axes 13 of the respective centering elements 10 extend obliquely or perpendicularly to the shaft bearing axis 14. In particular, the longitudinal center axis 13 of at least one of the centering elements 10 and the shaft bearing axis 14 extend in a skew manner with respect to one another. In the present example, the machine housing 1 has two first centering element receptacles 5 in/on the first housing part 2, two second centering element receptacles 7 in/on the second housing part 3, and two centering elements 10. Provision may be made for the machine housing 1 to have more than two first centering element receptacles 5, more than two second centering element receptacles 7, and more than two centering elements 10. If the machine housing 1 has two or more centering elements 10 and accordingly associated first centering element receptacles 5 and second centering element receptacles 7, provision is made—as in the present example—for the longitudinal center axes 13 of the centering elements 10 and the shaft bearing axis 14 to be arranged in a skew manner with respect to one another.

Also indicated in FIG. 1 is a plane 15 which is intersected perpendicularly by the shaft bearing axis 14. In this case, it is also apparent from FIG. 1 that the longitudinal center axes 13 of the centering elements 10 lie jointly in the (imaginary) plane 15. In other words, the longitudinal axis 13 of at least one of the centering elements 10 and the plane 15 coincide. In the present case, the longitudinal center axes 13 of all the centering elements 10 extend in the plane 15.

FIG. 2 shows a schematic view, in section along a section plane II-II (see FIG. 1), of the machine housing 1, wherein the two housing parts 2, 3 have been aligned with one another by means of two centering elements 10. In this case, the (imaginary) plane 15 and the drawing plane of FIG. 2 coincide. Also illustrated in FIG. 2 is an imaginary mirror plane 16, wherein the machine housing 1 is formed in a plane-symmetric manner with regard to this mirror plane 16. It is apparent that the mirror plane 16 and the shaft bearing axis 14 coincide, meaning that the shaft bearing axis 14 extends in the mirror plane 16. In this case, the longitudinal center axes 11, 12, 13 enclose with one another an angle 17 which is between 0° and 180° and is other than 0° and than 180°. This results in a V-shaped arrangement of the longitudinal center axes 11, 12, 13 or of the centering element receptacles 5, 7 and the centering elements 10.

One of the first centering element receptacles 5, a plurality of the first centering element receptacles 5 or all of the first centering element receptacles 5 may be in the form of a respective through-hole (not illustrated) which passes entirely through a wall element 18 of the first housing part 2. In this case, the respective through-hole or the respective first centering element receptacle 5 is then sealed off at least at an internal circumferential surface 19 of the first housing part 2, for example by means of a sealing element. The corresponding sealing element may be formed in particular by the centering element 10 that is or has been inserted into the through-hole. Alternatively, provision may be made for the sealing element to be a component other than the corresponding centering element 10.

In the present example, at least one of the first centering element receptacles 5, a plurality of the first centering element receptacles 5 or all of the first centering element receptacles 5 is/are in the form of a respective blind hole 20. In this case, an internal circumferential contour of the respective blind hole 20 corresponds to an external circumferential contour of the centering elements 10. A diameter of the respective blind hole 20—like a diameter of the respective through-hole—exhibits an undersize in relation to an outside diameter of the respective centering element 10, such that the respective centering element 10 is fastened in/on the first housing part 2 by a press fit being established between the blind hole 20 or the through-hole and the centering element 10. Once the corresponding centering element 10 has been inserted into the associated first centering element receptacle 5 as intended, the centering element 10 projects out of the first housing part 2, in particular out of the first centering element receptacle 5, and—when the two housing parts 2, 3 have been fastened together as intended—simultaneously into the associated second centering element receptacle 7.

In the present example, the second housing part 3 has a collar element 21 which (see FIG. 1) at least regionally engages around the first housing part 2 along its external circumferential direction. In this case, at least one of the second centering element receptacles 7 is formed on the collar element 21, which is formed in the shape of a circular ring. It is furthermore possible, in the machine housing 1, for more second centering element receptacles 7 to be formed in/on the collar element 21. In the present case, provision is made for all of the second centering element receptacles 7 to be formed in/on the collar element 21. For example, the respective second centering element receptacle 7 is in the form of a through-hole which passes entirely through the collar element 21 in a radial direction. In this case, an inside diameter of the through-hole passing through the collar element 21 and the outside diameter of the respective centering element 10 correspond to one another, such that a form fit is established between the centering element 10 fastened in the corresponding first centering element receptacle 5 and the associated second centering element receptacle 7.

FIG. 3 shows a schematic detail view of the region III (see FIG. 1 and FIG. 2) of the machine housing 1 and of the two housing parts 2, 3, wherein the second centering element receptacle 7 formed on the collar element 21 is in the form of a groove 22 in the collar element 21. It is furthermore apparent from FIG. 3 that the collar element 21, in a further configuration, may be in the form of an interrupted circular ring, with the result that the second housing 3 has, as collar element 21, a crenellated structure which may have at least one crenellation part 23 or a plurality of crenellation parts 23. In this case, the groove 22 is formed in/on the crenellation part 23.

The groove 22 has in particular a depth that corresponds at most to an outside radius dimension of the respective centering element 10, such that at most half, i.e. at most an arc measure of 180°, of an external circumference of the centering element 10 is enclosed, along its external circumferential direction, by the groove 22. If—as is provided in the present example—the respective centering element 10 has a circular cylindrical shape, this means, for the groove 22, that the latter has a semicircular cross-sectional shape. The radius of the groove 22 and the radius of the centering element 10 correspond in this case to one another such that the centering element 10 can be inserted compatibly into the groove 22. This makes it possible to put together or assemble the two housing parts 2, 3 along an assembly direction 24 which extends in particular parallel to the shaft bearing axis 14 or coincides with the shaft bearing axis 14.

To describe the method for producing the machine housing 1, reference is made once again to FIG. 1. In the method, a first housing blank 25 and a second housing blank 26 are fastened together reversibly in a non-destructive manner by means of a fastening device 27. For example, the two housing blanks 25, 26 are screwed together, meaning that the fastening device 27 has, for example, an internal thread in the first housing blank 25 and a screw element corresponding thereto, which passes entirely through the second housing blank 26 and in the process projects into the first housing blank 25, in particular into the internal thread thereof, establishing a threaded connection, and is fastened there. This means that the housing blanks 25, 26 are clamped together by means of the screw element of the fastening device 27. It is furthermore conceivable, alternatively or in addition, for the fastening device 27 to be some other fastening means, for instance a fastening means that acts by way of a force fit, such as a clamping apparatus etc. In any case, the fastening device is configured to clamp the two housing blanks 25, 26 and—in the further course of the method—the housing parts 2, 3 together by way of a force and/or form fit and to fix them together.

The first housing part 2 is manufactured from the first housing blank 25 and the second housing part 3 is manufactured from the second housing blank 26. Consequently, in this stage of the method, the housing blanks 25, 26 have neither centering element receptacles 5, 7 nor shaft bearing seats 4, 6. It is only after the housing blanks 25, 26 have been fastened together by means of the fastening device 27 that the first centering element receptacles 5 are formed on the first housing blank 25 and the second centering element receptacles 7 are formed on the second housing blank 26. Furthermore—while the housing blanks 25, 26 are clamped together by means of the fastening device 27—the shaft bearing seats 4, 6 are formed. As a result, the housing parts 2, 3 are manufactured from the housing blanks 25, 26, wherein the shaft bearing axis 14 is defined.

To install the shaft bearings, in particular rolling bearings, in the shaft bearing seats 4, 6, the arrangement having the first housing part 2 and the second housing part 3 is taken apart by releasing the fastening device 27. In the present example, the screw element is unscrewed from the housing parts 2, 3. Material separation, for example weld cutting, sawing, breaking etc., is not used to take apart the housing parts 2, 3 or to take apart the arrangement, since the housing blanks 25, 26 and consequently the housing parts 2, 3 are formed or provided separately from one another—that is to say not in one piece. Before, during or after the taking apart of the housing parts 2, 3, a respective one of the centering elements 10 is inserted into the respective first centering element receptacle 5. In the present case, the first housing part 2 has two first centering element receptacles 5, meaning that a first of the centering elements 10 is inserted into one of the first centering element receptacles 5 and a second of the centering elements 10 is inserted into the correspondingly other one of the first centering element receptacles 5. In the process, in particular a press fit is established between the respective first centering element receptacle 5 and the respective centering element 10.

At this stage of the method, the two housing parts 2, 3 are thus separate from one another, wherein the centering elements 10 project out of the first housing part 2 or out of the respective first centering element receptacle 5. In order to form the collar element 21 on the second housing part 3, provision may be made in particular for the latter first of all to be formed as a continuous circular ring and then to be radially drilled through at the locations of the second centering element receptacles 7. At least a part of the circular ring is then removed, for example milled off, such that, of the bores formed at the locations of the second centering element receptacles 7, only the groove 22 remains. Optionally, provision may be made for the initially continuous circular ring of the collar element 21, away from the second centering element receptacles 7, in particular away from the grooves 22, to be removed further such that the crenellated structure or the crenellation portions 23 are produced. It is equally conceivable for the crenellated structure or the crenellation portions 23 and optionally the second centering element receptacles 7 to be at least already roughly formed during the primary forming of the second housing blank 26 and/or to be manufactured using at least one machining manufacturing method.

If corresponding shaft bearings have been installed in the corresponding shaft bearing seats 4, 6, the housing parts 2, 3 can be assembled to form the machine housing 1 particularly easily and/or with particularly little complexity, wherein the centering elements 10, which engage both in the first housing part 2 and in the second housing part 3, ensure that the shaft bearing axis 14 extends exactly perpendicularly to the first base element 8 of the first housing part 2 and at the same time exactly perpendicularly to the second base element 9 of the second housing part 3. As a result, the machine shaft to be mounted by means of the shaft bearings is particularly advantageously mounted rotatably both on the first housing part 2 and on the second housing part 3, wherein the shaft meets or passes through the base elements 8, 9 and the corresponding shaft bearings exactly perpendicularly.

Overall, by way of the machine housing 1, by way of the method for producing the machine housing 1, and by way of the machine that has the machine housing 1, respective possible ways of aligning the two housing parts 2, 3 repeatably with one another particularly easily and with particularly little complexity and also precisely and without a loss of accuracy have been demonstrated. On account of the centering elements 10 and centering element receptacles 5, 7 arranged obliquely or perpendicularly to the shaft bearing axis 14, disassembly and reassembly of the two housing parts 2, 3 is made significantly easier. In other words, exact repeatable positioning on assembling the housing parts 2, 3 to form the machine housing 1 is ensured.

LIST OF REFERENCE SIGNS

1 Machine housing
2 First housing part
3 Second housing part
4 First shaft bearing seat
5 First centering element receptacle
6 Second shaft bearing seat
7 Second centering element receptacle
8 First base element
9 Second base element
10 Centering element
11 Longitudinal center axis of the first centering element receptacle
12 Longitudinal center axis of the second centering element receptacle
13 Longitudinal center axis of the centering element
14 Shaft bearing axis
15 Plane
16 Mirror plane
17 Angle
18 Wall element
19 Internal circumferential surface
20 Blind hole
21 Collar element
22 Groove
23 Crenellation portion
24 Assembly direction
25 First housing blank
26 Second housing blank
27 Fastening device

The invention claimed is:

1. A machine housing comprising:
a first housing part, which has a first shaft bearing seat and two first centering element receptacles;
a second housing part, which is formed separately from the first housing part and which has a second shaft bearing seat and two second centering element receptacles;
two straight centering elements, wherein
each centering element engages both in one of the first centering element receptacles and in one of the second centering element receptacles, such that the two first and second centering element receptacles connected via the centering element are aligned axially with one another, such that the housing parts are aligned with one another such that the shaft bearing seats are centered axially along a common shaft bearing axis,
a respective longitudinal center axis of the centering elements extends obliquely or perpendicularly to the shaft bearing axis,
the second housing part has a collar element on which one of the second centering element receptacles is formed, and
the second centering element receptacles formed on the collar element are in the form of a groove in the collar element.

2. The machine housing according to claim 1, wherein the longitudinal center axis of one of the centering elements and the shaft bearing axis are arranged in a skew manner with respect to one another.

3. The machine housing according to claim 2, wherein
the longitudinal center axis of one of the centering ele-
ments and a plane that is arranged perpendicularly to
the shaft bearing axis coincide.

4. The machine housing according to claim 3, wherein
the machine housing is formed in a plane-symmetric
manner with regard to a mirror plane, and the mirror
plane and the shaft bearing axis coincide.

5. The machine housing according to claim 4, wherein
the longitudinal center axes of two centering elements
arranged on different sides of the mirror plane enclose
an angle other than 0° and other than 180° with one
another in the mirror plane.

6. The machine housing according to claim 5, wherein
the second housing part has a collar element on which one
of the second centering element receptacles is formed.

7. The machine housing according to claim 6, wherein
the second centering element receptacle formed on the
collar element is in the form of a groove in the collar
element.

8. The machine housing according to claim 7, wherein
the groove has a depth which corresponds at most to an
outside radius dimension of the respective centering
element, such that the centering element is enclosed by
the groove at most through 180° along its external
circumferential direction.

9. The machine housing according to claim 8, wherein
one of the first centering element receptacles is in the form
of a blind hole.

10. The machine housing according to claim 9, wherein
one of the first centering element receptacles is in the form
of a through-hole which is sealed off on one side by
means of a sealing element.

11. A method for producing a machine housing configured
according to claim 10, wherein
a first housing blank and a second housing blank are
fastened together reversibly in a non-destructive man-
ner via a fastening device;
the first centering element receptacles are formed on the
first housing blank and the second centering element
receptacles are formed on the second housing blank;
the first shaft bearing seat is formed on the first housing
blank and the second shaft bearing seat is formed on the
second housing blank, such that the housing parts are
produced and the shaft bearing axis is defined;
one of the centering elements is inserted into the respec-
tive first centering element receptacle; and
the housing parts are detached from one another by the
fastening device being opened.

12. A machine having a machine housing configured
according to claim 10, wherein a shaft of the machine is
rotatably mounted coaxially with the shaft bearing axis via
the shaft bearing seats both by means of the first housing part
and by means of the second housing part.

* * * * *